March 2, 1965 E. H. IMLAY 3,172,097

BINARY TO BINARY-CODED-DECIMAL CONVERTER

Filed July 27, 1961 4 Sheets-Sheet 1

INVENTOR.
Edward H. Imlay

BY Lyon & Lyon

Attorneys

BINARY TO BINARY-CODED-DECIMAL CONVERTER

Filed July 27, 1961 4 Sheets-Sheet 2

INVENTOR.
Edward H. Imlay
BY
Lyon & Lyon
Attorneys

BINARY TO BINARY-CODED-DECIMAL CONVERTER

Filed July 27, 1961 4 Sheets-Sheet 3

A = SAMPLE COMMAND
B = EXT. BINARY DIGIT
C = CLEAR COMMAND
S = SHIFT COMMAND
$N_N$ = BINARY 1 IN REGISTER STAGE ($N_N$)
$N_{N-1}$ = BINARY 1 IN PREVIOUS REGISTER STAGE ($N_{N-1}$)

INVENTOR.
Edward H. Imlay

BY [signature]

Attorneys

BINARY TO BINARY-CODED-DECIMAL CONVERTER

Filed July 27, 1961

C = CLEAR COMMAND
I = COMPLEMENT COMMAND
S = SHIFT COMMAND
$G_N$ = BINARY 1 IN STAGE
$G_{N-1}$ = BINARY 1 IN PREVIOUS STAGE

INVENTOR.
Edward H. Imlay
BY Lyon & Lyon
Attorneys

United States Patent Office 3,172,097

Patented Mar. 2, 1965

3,172,097

BINARY TO BINARY-CODED-DECIMAL CONVERTER

Edward H. Imlay, Alhambra, Calif., assignor, by mesne assignments, to the United States of America as represented by the Administrator of the National Aeronautics and Space Administration Filed July 27, 1961, Ser. No. 127,234

4 Claims. (Cl. 340—347)

This invention relates to apparatus for converting an electrical signal pattern, representative of binary numbers, into an electrical signal pattern, representative of corresponding binary-coded-decimal numbers. More particularly, this apparatus relates to improvements in binary to binary-coded-decimal code converters.

In an article appearing in the December 1958 issue of the IRE Transactions on Electronic Computers, volume EC–7, Number 4, by John F. Couleur, entitled "BIDEC-A Binary-to-Decimal or Decimal-to-Binary Converter," there is described a circuit arrangement for performing a binary to binary-coded-decimal conversion. The structure described in this article for performing the indicated function requires a shift register having as many individual stages as are required to represent the largest number in binary-coded-decimal form. Since there are four binary bit positions allocated for each decimal position, this means that the register consists of 4N stages, which are grouped to form N decimal decades, the contents of each decade being a decimal digit in binary-coded form.

The conversion process employed consists of entering a binary number to be converted into the register, one bit at a time, most significant digit first, testing the content of each decade prior to each shift, and adding three to any decade which contains a five or greater. It will be noted that, in view of the fact that a provision must be made for simultaneously testing the contents of each decade and for adding a three to any decade which contains five or greater, duplicate logic circuits are required for each decade. Thus, if there are three decades in the shift register, the logic equipment is duplicated three times. If there are 15 or 25 decades, then the required logic equipment must be duplicated for each one of the 15 or 25 decades.

An object of this invention is the provision of a binary to binary-coded-decimal converter circuit wherein one set of logic circuits is all that is required, regardless of the number of decades in the shift register.

Another object of this invention is the provision of a binary to binary-coded-decimal converter which uses less apparatus for effectuating such conversion than heretofore-known systems.

Yet another object of the present invention is the provision of a novel and inexpensive binary to binary-coded-decimal converter.

These and other objects of the present invention may be achieved in an arrangement comprising a shift register which may have as many four-stage decades as are required to handle the desired maximum binary-coded decimal number. In association therewith, there is provided another shift register, known as a complement-shift register, which need have only four stages. Provision is made for entering into the shift register a binary number which it is desired to convert to binary-coded-decimal form. The most significant three digits of this binary number are then shifted into the complement-shift register. There is associated with the complement-shift register logic for sensing whether or not the value of its contents equals or exceeds five, and, if it does, a three is added thereto. After the sensing operation, the contents of the complement-shift register and the shift register are both shifted one binary digit position in the direction of the highest-order bits in these registers. Any overflow bit from the complement-shift register is shifted into the location previously occupied by the lowest-order bit of the binary number in the shift register. Simultaneously therewith the most significant binary bit of the number yet remaining in the shift register is entered into the least significant bit position in the complement-shift register. Once again, an inspection is made to determine whether or not the number in the complement-shift register equals or exceeds five, and, if it does, to add three.

A shift operation of the type just described occurs again. The shaft, inspect, add three if required, and then shift operation occurs repeatedly until the last, or least-significant, binary bit in the shift register has been entered into the complement-shift register; the contents of the complement-shift register at that time have been inspected, three added if required, and then shifted. The complement-shift register now contains the lowest-order binary-coded-decimal digit. Both the complement-shift register and the shift register are then circulated, so that the contents of the complement-shift register are entered into the register following the lowest-order binary digit and the first three binary bits occupying the highest-order position in the shift register are entered into the complement-shift register.

The operations just described are then repeatedly performed until the shift register has had transferred out of it all the binary bits in the binary number and there remains in the shift register the four binary bits representing the least-significant decimal digit. At this time, the complement-shift register contains four binary bits, which represent the next-higher decimal digit. Both complement-shift register and shift register are then shifted until the next three binary bits occupying the most significant position in binary number remaining in the register are entered into the complement-shift register, and the shift register also contains the eight bits representing the two least-significant binary-coded decimal digits. This operation continues until the original binary number has been completely converted to binary-coded-decimal form. At this time, the shift register may be emptied of its contents and a new number entered therein.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

It is known that the decimal value of any digit in a binary number is $2^{N-1}$, where N is the location of the digit in the number. Thus, the decimal value of a binary number may be determined by adding appropriate powers of two, as indicated by the presence of ones in the binary number. Powers of two may be readily calculated by doubling one $N-1$ times, or by multiplying the one in the binary number by two, $N-1$ times.

Figure 1:
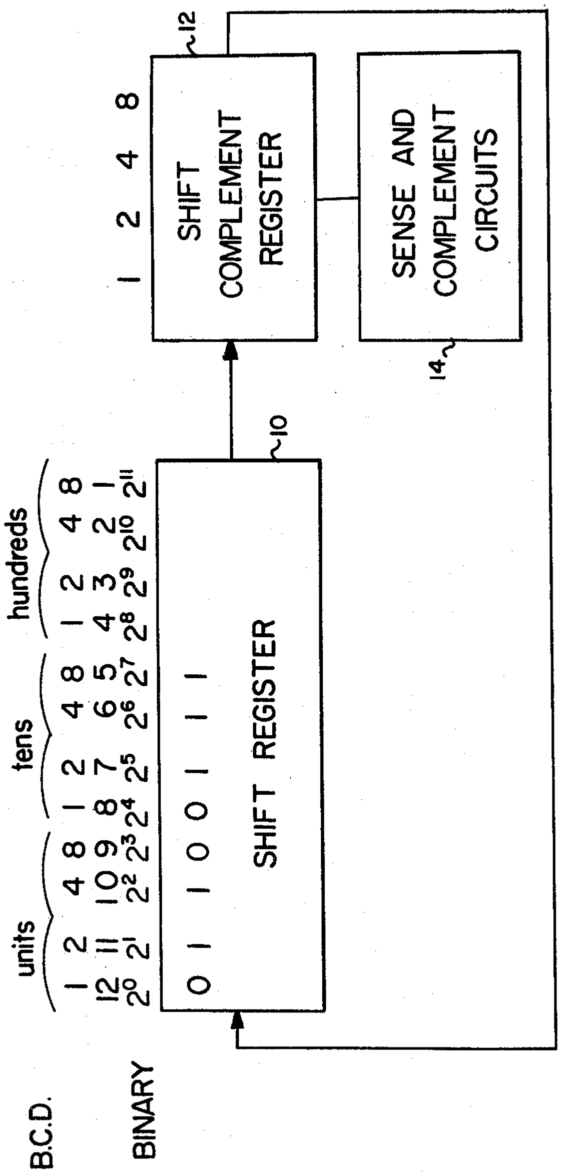
FIGURE 1 is a block diagram representing a shift register and a complement-shift register, shown to assist in an understanding of the invention.

It is common knowledge that a shift register can readily multiply a binary number by two by shifting the entire number within the register once towards the most significant end of the register. This preliminarily requires that arbitrary values of multiples of two be assigned to each one of the register stages. A shift register may also be made to hold a binary-coded-decimal number by the simple expedient of assigning four stages to represent the value of a decade in binary-code form. Referring to FIGURE 1, this may be readily seen, if it is assumed that the rectangle 10 represents a shift register having 12 stages. The twelve stages may be divided into three decades of four stages each, respectively, units, tens, and hundreds, and the stages within a decade may have the value one, two, four, eight.

The shift register 10 also may be made to contain a binary number, and a binary number is shown entered therein in stages 4 through 12, which are inversely given the values from $2^0$ to $2^7$. By way of example, the binary number 11100110 shown in the shift register 10 equals 230 in the decimal system.

In accordance with this invention, a complement-shift register 12 may include four stages, having assigned thereto the values, respectively, one, two, four, and eight. As will be described more fully subsequently herein, the contents of the shift register 10 are successively entered into the complement-shift register 12, to be operated thereon in order that a conversion to binary-coded-decimal may occur.

After the first three binary digits have been entered into the complement-shift register 12, circuits designated as sense-and-complement circuits 14 sense these first three digits to determine whether or not their value is five or greater. If the value is five or greater, then three is added to the number in the complement-shift register, and the complement-shift register contents are shifted one digit position in the increasing binary direction. If the value in the complement register is not five or greater, then the contents are simply shifted one binary digit position in the increasing binary order direction. Since under the assumed example the value of the binary number now in the complement-shift register exceeds five, the value three is added thereto, converting the number in the complement-shift register to 1010.

The next step is to shift both the shift register and the complement-shift register one binary-bit position. When this occurs, the one digit in the eight position of the complement-shift register is inserted in the number 12 stage of the shift register, the zero, which was in the number one stage of the shift register, is inserted into the one position of the complement-shift register. In other words, both shift register and complement-shift register are shifted together, with the overflow from the complement-shift register being circulated back into the shift register. Now, another inspection step occurs. Since the value of the number now in the complement-shift register is less than five, no addition of three is necessary, and a shift operation occurs which changes the value of the number in the shift register from 0100 to 1000, or from four to eight. Of course, the overflow from the complement-shift register is now inserted into the shift register, following the one which was previously inserted therein.

*Table 1*

| Step | In Complement-Shift Register | | | | In Register—230 | | | | | | | | | | | |
|---|---|---|---|---|---|---|---|---|---|---|---|---|---|---|---|---|
| | 8 | 4 | 2 | 1 | 1 | 2 | 3 | 4 | 5 | 6 | 7 | 8 | 9 | 10 | 11 | 12 |
| | | | | | 1 | 1 | 1 | 0 | 0 | 1 | 1 | 0 | ---- | ---- | ---- | ---- |
| Read-in | 0 | 1 | 1 | 1 | 0 | 0 | 1 | 1 | 0 | ---- | ---- | ---- | ---- | ---- | ---- | ---- |
| Add 3 | 1 | 0 | 1 | 0 | 0 | 0 | 1 | 1 | 0 | ---- | ---- | ---- | ---- | ---- | ---- | ---- |
| Shift | 0 | 1 | 0 | 0 | 0 | 1 | 1 | 0 | ---- | ---- | ---- | ---- | ---- | ---- | ---- | 1 |
| Shift | 1 | 0 | 0 | 0 | 1 | 1 | 0 | ---- | ---- | ---- | ---- | ---- | ---- | ---- | 1 | 0 |
| Add 3 | 1 | 0 | 1 | 1 | 1 | 1 | 0 | ---- | ---- | ---- | ---- | ---- | ---- | ---- | 1 | 0 |
| Shift | 0 | 1 | 1 | 1 | 1 | 0 | ---- | ---- | ---- | ---- | ---- | ---- | ---- | 1 | 0 | 1 |
| Add 3 | 1 | 0 | 1 | 0 | 1 | 0 | ---- | ---- | ---- | ---- | ---- | ---- | ---- | 1 | 0 | 1 |
| Shift | 0 | 1 | 0 | 1 | 0 | ---- | ---- | ---- | ---- | ---- | ---- | ---- | 1 | 0 | 1 | 1 |
| Add 3 | 1 | 0 | 0 | 0 | ---- | ---- | ---- | ---- | ---- | ---- | ---- | ---- | ---- | ---- | ---- | ---- |
| Shift | 0 | 0 | 0 | 0 | ---- | ---- | ---- | ---- | ---- | ---- | ---- | 1 | 0 | 1 | 1 | 1 |
| Circulate | 0 | 1 | 0 | 1 | 1 | 1 | 0 | 0 | 0 | 0 | ---- | ---- | ---- | ---- | ---- | ---- |
| Add 3 | 1 | 0 | 0 | 0 | 1 | 1 | 0 | 0 | 0 | 0 | ---- | ---- | ---- | ---- | ---- | ---- |
| Shift | 0 | 0 | 0 | 1 | 1 | 0 | 0 | 0 | 0 | ---- | ---- | ---- | ---- | ---- | ---- | 1 |
| Shift | 0 | 0 | 1 | 1 | 0 | 0 | 0 | 0 | ---- | ---- | ---- | ---- | ---- | ---- | 1 | 0 |
| Circulate | ---- | ---- | ---- | ---- | ---- | ---- | 1 | 0 | 0 | 0 | 1 | 1 | 0 | 0 | 0 | 0 |

Table 1 shows the successive steps which occur in the embodiment of the invention for converting a binary number to a binary-decimal-coded number. The number taken, by way of example, is the number shown in the shift register 10, which equals 230. The binary number is entered into the shift register so that each bit is stored in a stage which is assigned to represent a binary digit of the proper order. The binary digits are to be shifted serially, highest-order digit first, into the complement register 12. Assume at the outset that the first three binary digits are shifted into the complement-shift register 12. In Table 1 this step is designated as a read-in. At the same time that the first three binary digits of the shift register 10 are shifted into the complement-shift register, the other binary digits will also be shifted, so that the fourth binary digit is ready to be entered into the complement-shift register upon the next shift operation. Under the column designated "In Complement-Shift Register," there is shown the contents of the complement-shift register at each step of the operation. Under the column "In Register," there is shown the contents of the register for the corresponding contents of the complement-shift register.

Since the number in the complement-shift register now exceeds five, three is added thereto, and then the complement-shift register and shift register are shifted one binary bit position. This results in the number 0111 being in the complement-shift register, which exceeds five, and the number 101 is now in the shift register. The addition of three to the number in the complement-shift register results in the number 1010 now being in the complement register. Upon the occurrence of the shift operation, the number in the complement-shift register now becomes 0101, and the number in the shift register received from the shift register is now 1011.

The number in the complement-shift register is five or greater, and, therefore, the value three is added thereto. This converts the number in the complement-shift register to 1000. Upon the occurrence of the shift operation, the number in the complement-shift register is 0000, and the number in the shift register is 10111. It should be noted that the number now in the complement register represents the units decade in binary-coded-decimal and is the units value of the decimal equivalent of the original binary member in the shift register. In order to preserve this binary-coded-decimal value, the contents of the shift register and complement-shift register are circulated until the four zeros are in the shift register and the first three binary digits of the number remaining in the shift register have been entered into the complement-shift register.

The operation previously described will then again take place. The number in the complement-shift register, namely, 101 is sensed, and, since it is five or above, three is added thereto, giving the value 1000 in the complement register. Upon the occurrence of the shift operation, the number in the complement-shift register becomes 0001, and the overflow one is inserted into the shift register. Since the number in the complement-shift register does not equal five or exceed it, the shift operation alone occurs next, with the result that the number now in the complement-shift register is 0011, and the number due to complement-shift register overflow, which is in the register, is 10. In addition, the units decade value 0000 is now also in the shift register in position to be inserted into the complement-shift register.

Consideration of the binary-coded-decimal number, now in the complement-shift register, shows that it equals three, which is the ten's decade value of the number 230, and the number which remains in the register as the result of preceding overflow is 10, which equals two. Therefore, by merely circulating the shift register so that the contents of the complement-shift register are in the proper decade position in the shift register, the binary-coded-decimal number equivalent of the original binary number is now in the shift register and can be read out.

The reason for adding three to a binary number in the complement-shift register before shifting is because, when it is desired to multiply by two by a shift operation, shifting a number from an "eight" position of a units decade to a "one" position of a ten decade does not double the value of that number—i.e., go from 8 to 16—but, rather, only adds two to that number—i.e., go from 8 to 10. Thus, it is necessary to add six in order to properly represent the value of a binary number which exceeds 10 and which is being converted by shifting from binary to binary-coded-decimal form. This can be very simply effectuated by adding three to the number in the complement-shift register before shifting. When the number is then shifted, it is effectively the same as if six is added to the number after such shift. The addition of three can be effectuated by complementing. The rules for complementing are as follows:

For a one in the four and one stages, 0101=5, or 0111=7 (of the complement-shift register), complement the eight, four, and one stages, 1000=8, or 1010=10. When there is a 6 or 0110 in the complement-shift register, for a one in the four and two stages and a "not one" in the first stage, complement the eight, four, two, and one stages, or 1001=9. For a one in the eight stage and a "not one" in the one stage, or 1000=8, complement the two and one stages, or 1011=11. For a one in the eight and one stages, or 1001=9, complement the four and one stages, or 1100=12. By "not one" is meant that there is a zero in the one stage.

Figure 2:
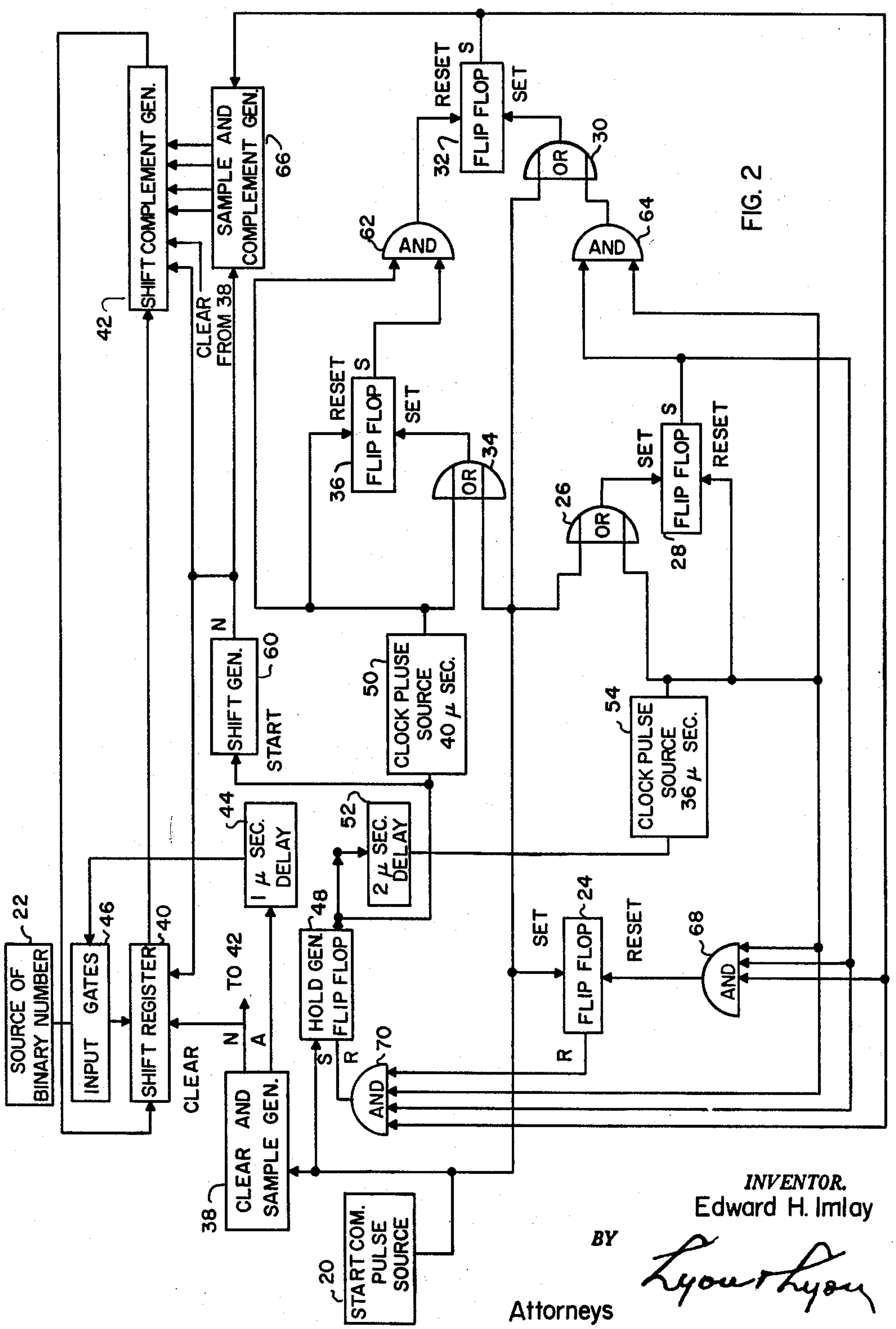
FIGURE 2 is a block schematic diagram of an embodiment of the invention.

Reference is now made to FIGURE 2, which is a block schematic diagram of an embodiment of this invention. A source of pulses, designated as "start-command-pulse source" 20, is energized to emit a pulse when it is desired to convert a binary number from a source of binary numbers 22 to a binary-coded decimal form. The pulse from the source 20 is applied to a flip-flop circuit 24, driving it to its set state. The pulse is also applied through an OR gate 26 to the set input of a flip-flop 28 for the purpose of driving it to its set state. The pulse is also applied through an OR gate 30 to the set input of a flip-flop circuit 32 for the purpose of driving flip-flop 32 to its set state, and, finally, the pulse is applied through an OR gate 34 to a flip-flop 36, for the purpose of driving flip-flop 36 to its set state.

The pulse output of the start-command-pulse source is also applied to a clear-and-sample generator 38. The clear-and-sample generator comprises a pulse-generator circuit, which provides as an output a positive pulse, designated by the N-output lead, and a negative pulse, designated by the A-output lead. The negative-output pulse is applied to a shift register 40 and to a complement-shift register 42. The positive pulse serves to clear both the shift register 40 and the complement-shift register 42. The negative-pulse output of the clear-and-sample generator is applied to a one-microsecond delay network 44, the output of which is applied to input gates 46. These input gates permit a binary number from the source of binary members 22 to be entered into the shift register 40.

A hold-generator flip-flop circuit 48, which, from a previous operation had been left in its reset state, is now driven to its set state by the output from the start-command-pulse source 20. The set output of the hold-generator flip-flop is then applied directly to a first clock-pulse source 50, which provides output clock pulses every 40 microseconds, and also through a two-microsecond delay network 52 to a second clock-pulse source 54, to start it, whereupon it emits clock pulses at the rate of one every 36 microseconds. The output of the hold-generator flip-flop which has passed through the two-microsecond delay 52 is also applied to a shift generator 60, in order to cause the shift generator to start emitting pulses. The shift generator does this at the rate of a pulse every two microseconds.

The output of the 40-microsecond clock 50 is applied to a flip-flop circuit 36, which is a binary flip-flop or one of the type which is driven from its set to its reset state in response to successive input pulses. Thus, the first clock pulse from the source 50, which is applied to the flip-flop 36 which was previously set by the start-command-pulse source output, will drive it to its reset state. The second output from the clock-pulse source will drive it to its set state, etc. It will be noted that the clock-pulse source output is also applied to the set input terminal of the flip-flop 36 through the OR gate 34. The purpose of the flip-flop 36 is to double the time interval between pulses from the clock-pulse source 50. The output of the flip-flop 36 is applied to an AND gate 62, which has as its other enabling input a direct output from the clock-pulse source 50. The output of the AND gate 62 is applied to the reset input of flip-flop 32, which is of a similar type as the flip-flop 36.

The clock-pulse source 54 drives flip-flop 28 in a similar fashion as has been described for the clock-pulse source 50. The output of the clock-pulse source 54 is applied to an OR gate 26, to the set input terminal of flip-flop 28, and is also applied to the reset terminal of flip-flop 28. Thus, the flip-flop 28, which was initially placed in its set condition by the output of the start-command-pulse source 20, is now driven to its reset state by the first pulse from the clock-pulse source and to its reset state by the second pulse from the clock-pulse source 54, etc. The output of the flip-flop 28 is applied to an AND gate 64. The other enabling input of the AND gate 64 is derived from the clock-pulse source 54. The output of the AND gate 64 is applied to an OR gate 30, and the output of the OR gate 30 is applied to the set input terminal of the flip-flop 32.

The output of the flip-flop 32, when in its set state, is applied to a sample-and-complement generator 66. In the presence of the set output of flip-flop 32, the sample-and-complement generator is inhibited. When this signal is removed, then the sample-and-complement generator can proceed to function, whereby it looks at the contents of the shift register to determine if they equal or exceed five, and, if they do, the generator proceeds to complement the contents of the shift register 42 in the manner previously described.

Now that a binary number has been entered into the shift register and the shift generator has received a signal to start shifting, the shift register 40 transfers its first three most significant digits into the complement-shift register 42. The fourth, or most-significant stage, at this time represents a zero. The sample-and-complement generator looks at the contents of the complement-shift register 42, and, if they are equal or exceed five in value, three is added by the operation of complementing in accordance with the previous description. The shift operation then occurs, and the overflow digit from the complement-shift register is entered into the shift register, and the next in line of the digits in the shift register is entered into the complement register. This operation continues until, as was described in connection with Table 1, the number in the register has been passed through the complement-shift register.

A complete first cycle has occurred when the shift register contains the units decade of the binary-coded-decimal number and some binary digits which remain from the binary number. For the second cycle, both registers continue to operate to enter digits from the shift register 40 into the complement-shift register 42 for inspection and shifting, until all of the binary digits which are in front of the units decade have been entered into the complement-shift register. At this time, it is necessary to pass the units decade binary-coded-decimal number through the complement-shift register while the sample-and-complement generator 66 is inhibited or prevented from operating thereon. This function is accomplished by the flip-flop 32, which, in view of the clocking arrangements which have been described, is properly timed to emit a set pulse to hold the sample-and-complement generator inoperative while the units decade is passing therethrough.

It should be noted that on the next complete cycle the shift register will contain the tens as well as the units decade, in addition to some binary digits remaining from the binary number. In shifting the contents of the shift register 40 again through the complement-shift register, it will become necessary to hold the complement generator inoperative again for an interval sufficiently long to transfer therethrough the units and tens decades. In view of the staggered clock pulses emitted from the sources 50 and 54, the set pulse from flip-flop 32 gradually increases, in order to afford this type of operation.

In an embodiment of the invention which was built, the shift register was built to have a capacity to handle nine decades. The operation of the system was continued until the binary number originally entered into the shift register had been converted into a nine-decade binary-coded-decimal number. At that time, there was a simultaneous output from the clock 54, from the flip-flop 28 set output terminal, and from the flip-flop 32 set output terminal. The coincidence of these three outputs is detected by an AND gate 68, which emits an output to reset flip-flop 24. When flip-flop 24 is reset, its output, together with that of the clock-pulse source 54, the set output of flip-flop 28, and the set output of flip-flop 32 are all applied to a four-input AND gate 70. The output of the four-input AND gate 70 is applied to the hold-generator flip-flop, to drive it to its reset state. When the hold-generator flip-flop 48 is driven to its reset state, the enabling input is removed from the clock-pulse source 50, and, after two microseconds, from the shift generator 60 and the clock-pulse source 54. At this time, the apparatus has terminated its operation, and the shift register 40 contains a binary-coded-decimal number, which can be transferred out in any known manner.

Figure 3:
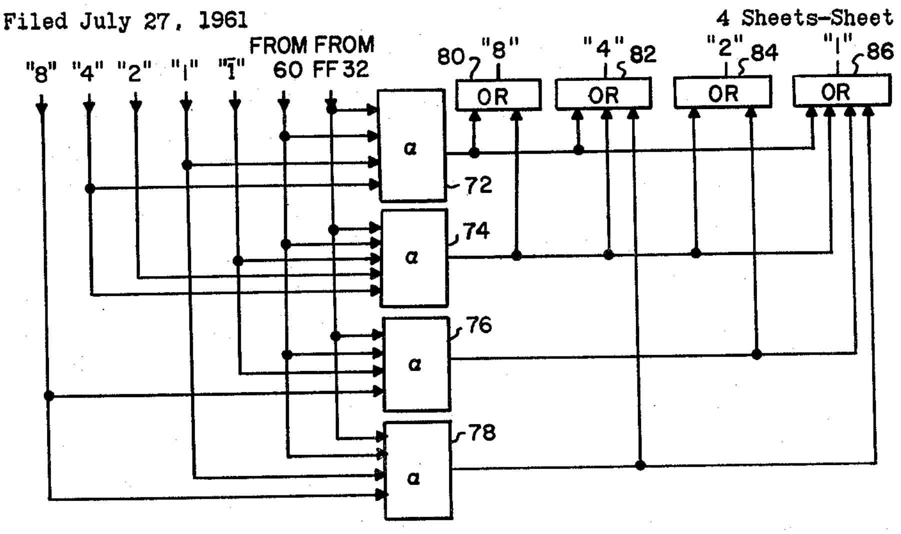
FIGURE 3 is a block schematic diagram showing the required logic circuits for inspection and complementing.

Reference is now made to FIGURE 3, which represents the logic circuits which are employed in the sample-and-complement generator 66. There are required four AND gates, respectively 72, 74, 76, and 78. Each one of these AND gates will have applied, as one of the required gating inputs, a connection from the shift-pulse generator 60. A second input to each one of the AND gates is an inhibit input, which is the output of the flip-flop 32. This prevents any signals passing through the AND gates while it is present. The first AND gate 72 will have as two further required inputs the set outputs, or one-indicating outputs of the "one" and "four" stages of the shift-and-complement generator 42. The second one of the AND gates 74 will have as its other required input the "one" output of the "two" and "four" stages of the shift-and-complement register and also the "not-one" output of the first stage of the shift-and-complement register. The "not-one" output of the first stage indicates the fact that there is a zero in that first stage.

The third AND gate 76 has as its other required inputs a "not-one" output of the first stage of the sample-and-complement shift register and a "one" output of the "eight" stage of the register. The fourth AND gate 78 has as its other required input the "one" output of the first stage of the shift register and the "eight" output of the fourth stage of the shift register.

Four OR gates are required, respectively 80, 82, 84, 86. The output of the AND gate 72 is applied to the OR gates 80, 82, and 86; the output of the AND gate 74 is applied to OR gates 80, 82, 84, 86; the output of the AND gate 76 is applied to OR gates 84 and 86; and the output of the AND gate 78 is applied to OR gates 82 and 86. The outputs of the OR gates 80, 82, 84, and 86 are respectively applied to the fourth, third, second, and first stages of the shift register, respectively designated as the "eight," "four," "two," and "one" representative stages. The outputs of the OR gates are applied to these stages to effectuate the complementing action, or, in other words, if there is a zero in that stage, then the OR gate serves to convert the stage to the one-representative condition, and vice versa.

Figure 4:
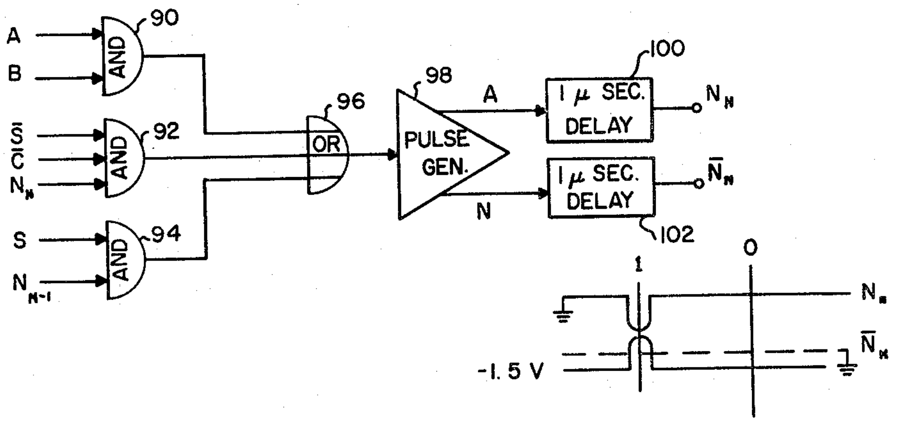
FIGURE 4 is a block schematic diagram of a shift register stage.

FIGURE 4 represents a block schematic diagram of a typical stage of the shift register 40. This will include three AND gate 90, 92, 94, the outputs of which are applied to an OR gate 96, the output of which is applied to a pulse amplifier 98. When the pulse amplifier is actuated by an input signal, its output comprises a positive and a negative signal, respectively designated as N and A. These signals are applied to one-microsecond delay networks, respectively 100, 102. The outputs of the delay networks are represented by the letters $N_n$, indicative of a negative output of the N-stage, and $\overline{N}_n$, indicative of the positive output of the N-stage. The input to the AND gate 90 comprises two signals, respectively designated as A and B. The A signal is the output of the clear-and-sample generator and is designated as the sample command. The B signal represents an external binary digit which is received from the source of binary numbers 22. The AND gate 92 has three inputs, respectively designated as $\overline{S}$, $\overline{C}$, and $N_n$. The $\overline{S}$ and $\overline{C}$ designations indicate the absence of a shift command and the absence of a clear command. The $N_n$ designation indicates that there is a "one" stored in the shift-register stage. This $N_n$ signal is the output from the one-microsecond delay network 100, which is applied to this lead. The input to the next AND gate 94 comprises an S, or shift, command signal, and a signal designated as $N_n-1$, derived from the preceding shift-register stage, which represents the fact that there is a one in the preceding shift-register stage. The wave shape diagram adjacent the block diagram indicates the output signals when the shift-register stage is storing a one, comprising a negative-going pulse $N_n$ and a positive-going pulse $\overline{N}_n$. When storing a zero, $N_n$ is at ground potential and $\overline{N}_n$ is $-1.5$ volts.

Figure 5:
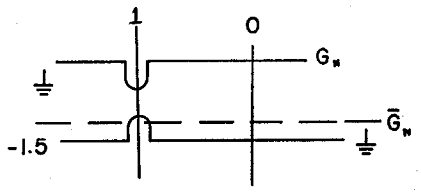
FIGURE 5 is a block schematic diagram of a complement-shift register stage.
Figure 5:
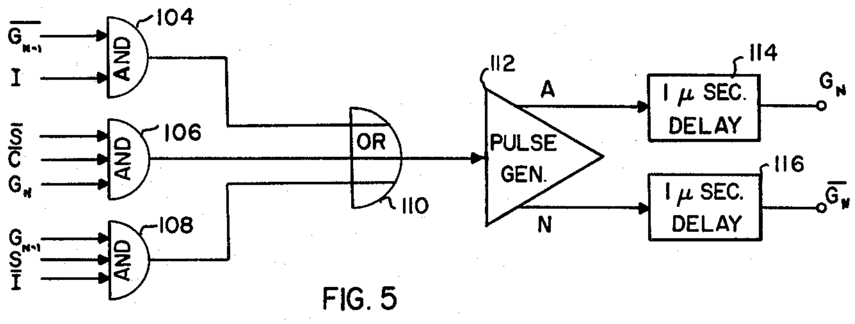
Figure 6:
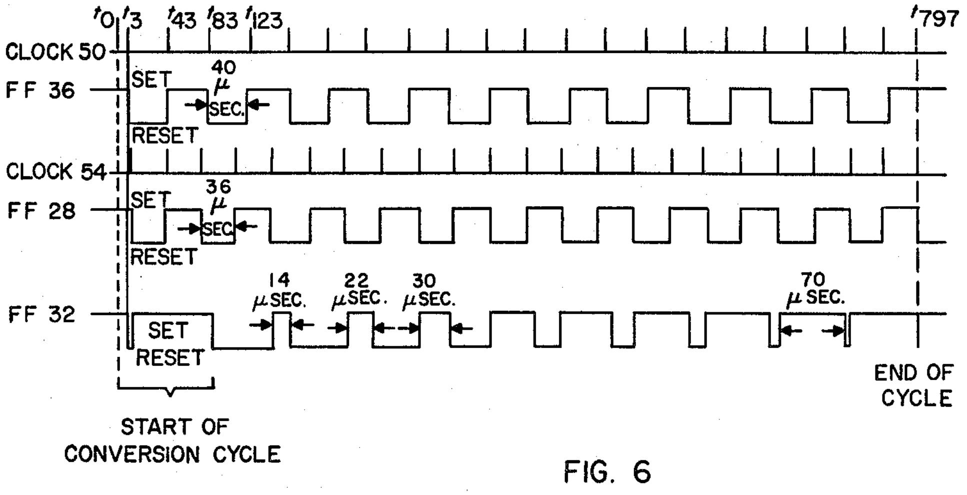
FIGURE 6 is a timing and wave shape diagram, shown to assist in an understanding of the invention.

FIGURE 5 is a block schematic diagram of a typical complement-shift register stage. This will include three AND gates, respectively 104, 106, 108. The outputs of the three AND gates are applied to an OR gate 110. The output of the OR gate 110 drives a pulse amplifier 112. The pulse amplifier is of the same type as employed in the shift-register stage and provides as an output a positive and a negative pulse when driven. These are respectively applied to two one-microsecond delay networks 114, 116. The outputs from the delay networks are respectively designated as $G_n$ for the negative output and $\overline{G}_n$ for the positive output. The input to the AND gate 104 comprises two signals, respectively designated as $\overline{G}_n-1$ and I. The $\overline{G}_n-1$ represents the fact that there is a zero being stored in the preceding shift-register stage. The I signal is the complement command, which may be received from the one of the OR gates shown in FIGURE 3. The next AND gate 106 has three inputs, respectively $\overline{S}$ and $\overline{C}$, indicative of the fact that no shift command and no complement-clear command have been received, and also a $G_n$ signal, which is the output $G_n$ indicated in the drawing. The last AND gate 108 has as its inputs $G_n-1$, indicative of the fact that there is a one stored in the preceding shift-register stage, S, indicative of the receipt of a shift command, and $\overline{I}$, indicative of the fact that no complement command has been received.

Effectively, AND gate 104 operates to complement a zero digit which is being transferred from the preceding stage into the present stage. AND gate 108 transfers a one digit from the preceding stage into the shift register uncomplemented in the absence of a complement command. In the presence of a complement command, AND gate 108 will not pass a signal, and the shift-register stage, as a result, will store a zero. AND gate 106 serves to hold the contents of the shift register which is being fed back thereto.

In the embodiment of the invention which was actually built, when a "one" signal was being stored in the stage, the output on terminal $G_n$ comprised a negative signal and the output on $\overline{G}_n$ comprised a positive-going signal. When "zero" was being stored in the stage, then the output on $G_n$ was at ground level, where the output on $\overline{G}_n$ was the steady output at substantially $-1.5$ volts.

Reference is now made to 56, which is a wave shape diagram, indicative of the operation of the clock pulses and the flip-flops, respectively 36, 28, and 32. At time $T_0$, it is assumed that a start-command pulse has been given and that all flip-flops 36, 28, and 32 have been driven to their set states. Two microseconds later, at time $T_3$, the clock pulses from clock 50 begin to occur and thereafter are shown as occurring at times $T_{43}$, $T_{83}$, etc. These clockpulses occur at intervals of 40 microseconds. The clock pulses from clock generator 54 will occur every 36 microseconds. However, the initial clock pulse is delayed two microseconds after the occurrence of the initial clock pulse from the clock-pulse generator 50. Every 40 microseconds flip-flop 36 is driven by clock-pulse source 50 to invert its state. Flip-flop 28 is driven to invert its state by clock-pulse source 54 every 36 microseconds. Flip-flop 32 is set when it receives a clock pulse from source 54 and an output from flip-flop 28 when in its set state. Flip-flop 32 is reset when it receives a clock pulse from source 50 and an output from flip-flop 36 when in its set state. By virtue of the dissymmetry of the operation acl eved, flip-flop 32 will be in its set state over increasingly longer intervals of time, whereby it will hold the complement generator 66 inoperative for increasingly longer intervals of time. As was previously pointed out, this is necessary in order that the already converted portion of the binary-coded-decimal number being circulated should not be altered.

There has accordingly been shown and described hereinabove a novel, useful, and simple arrangement for converting from binary-coded numbers to binary-coded-decimal numbers. It should be appreciated that there is no increase required in the conversion equipment or the logic which converts the binary number to the binary-coded-decimal number, other than the number of stages required by the shift register 40, despite any increase in the size of the binary number which is being processed. Some provision must be made for terminating the operation of the apparatus at the completion of the processing of the binary number. The values for the clock-pulse generator pulse intervals shown herein was computed for a nine-decade binary-decimal-coded number. It should be apparent that this will vary, dependent upon the size of the number. The variation of the clock-pulse generator frequencies is easily effectuated by those skilled in the art, so that the proper operation occurs, regardless of the size of the binary number being processed. Accordingly, it is to be understood that this invention will not be avoided by altering any of the values given for the clock-pulse intervals or the shift-pulse-generator frequency rate, or any of the other values used by way of illustration. These, together with the form of the circuits, are being shown in order to illustrate an actual working sample and to facilitate the description of the invention, and are not to be construed as a limitation on the invention.

I claim:

1. Apparatus for converting a binary number to a binary-coded-decimal number comprising a register having a capacity for holding four binary digits, means for successively entering the binary digits of a binary number most-significant digit first into one end of said register, means for periodically shifting all binary digits entered into said register one digit position toward the other end of said register, means for sensing the value of the number in siad register after each shift operation of said means for periodically shifting to determine whether the contents of said register equal or exceed five and producing an output indicative thereof, means responsive to said output for adding three to said number, storage means for receiving overflow binary digits from said other end of said register including means for repeatedly passing the contents of said storage means in the order received to said means for successively entering binary digits, timing means synchronized with the operation of said means for periodically shifting for rendering said means for sensing inoperative each time the contents of said register represents a binary-coded-decimal decade, and means responsive to said timing means attaining a predetermined timing state for terminating operation of said means for repeatedly passing the contents of said storage means to said means for successively entering binary digits and said means for periodically shifting, said predetermined timing state being attained when said storage means contains a binary-coded-decimal number equivalent to said binary number.

2. Apparatus for converting a binary number to a binary-coded-terminal number comprising a first shift register, means for entering a binary number to be converted into a binary-coded-decimal number into said first shift register, a second shift register having a capacity for handling at least four binary digits, first means for shifting from said first shift register the binary digits of said binary number into said second shift register most-significant digit first, second means for shifting the overflow binary digits from said second shift register into said first shift register simultaneously with the operation of said first shift means, a logic network coupled to said second shift register including means for determining after each binary digit has been entered into said second shift register and before the next shift operation whether the value of the number in said second shift register equals or exceeds five and producing an output indicative thereof, means responsive to said output for adding three to the number, and timing means operative synchronously with said first and second shift means for inhibiting the operation of said logic network each time the number in said second shift register represents a binary-coded decimal value and for indicating when said binary number has been completely converted to a binary-coded-decimal number.

3. Apparatus for converting a binary to a binary-coded-decimal number as recited in claim 2 wherein said timing means includes a first clock-pulse source providing output pulses at one frequency, a second clock-pulse source providing output pulses at a second frequency, an inhibit flip-flop circuit having a set and reset state, means to apply pulses from said first clock-pulse source to said inhibit flip-flop circuit to drive it to its set state responsive thereto, means to apply pulses from said second clock-pulse source to said flip-flop to drive it to its reset state, and means to inhibit the operation of said logic circuit responsive to output from said inhibit flip-flop in its set state.

4. Apparatus as recited in claim 3 wherein said first clock-pulse source comprises a first pulse source, a first flip-flop circuit having a set and reset state, means to apply pulses from said first pulse source to said first flip-flop circuit to drive said first flip-flop from set, to reset, to set states responsive to succeeding ones of said pulses, and means to apply output from said first flip-flop when in its set state to said inhibit flip-flop to drive it to its set state; said second clock-pulse source including a second pulse source, a second flip-flop circuit having a set and reset state, means to apply pulses from said second pulse source to said second flip-flop to drive it from its set, to reset, to set states in response to successive ones of said pulses, means for applying output from said second flip-flop when in its set state to said inhibit flip-flop to drive it to its reset state, and means responsive to the simultaneous occurrence of a pulse from said second pulse source and said second flip-flop and inhibit flip-flops being in their set states to terminate further operation of said first and second means for shifting indicative of said binary number being completely converted to a binary-coded-decimal number.

References Cited by the Examiner

UNITED STATES PATENTS 3,026,034 3/62 Couleur -------------- 235—155

OTHER REFERENCES

Richards: Arithmetic Operations in Digital Computers, 1955, pages 322 and 337–341, D. Van Nostrand Publ. Co.

MALCOLM A. MORRISON, *Primary Examiner.*